(12) United States Patent
Jao

(10) Patent No.: US 7,614,807 B2
(45) Date of Patent: Nov. 10, 2009

(54) ELECTRONIC CAMERA MECHANISM

(75) Inventor: Ching-Lung Jao, Miao-Li Hsien (TW)

(73) Assignee: Altus Technology Inc., Chu-Nan, Miao-Li Hsien (TW)

( * ) Notice: Subject to any disclaimer, the term of this patent is extended or adjusted under 35 U.S.C. 154(b) by 233 days.

(21) Appl. No.: 11/669,373

(22) Filed: Jan. 31, 2007

(65) Prior Publication Data

US 2007/0237519 A1 Oct. 11, 2007

(30) Foreign Application Priority Data

Apr. 7, 2006 (CN) .................... 2006 1 0060225

(51) Int. Cl.
*G03B 17/00* (2006.01)
*G03B 17/02* (2006.01)
(52) U.S. Cl. .................. 396/529; 396/542; 396/535
(58) Field of Classification Search .......... 396/529, 396/532, 535, 542, 89, 72; 348/373–376, 348/340
See application file for complete search history.

(56) References Cited

U.S. PATENT DOCUMENTS

| 4,864,348 | A  | * | 9/1989  | Fujiwara et al. ............. 396/542 |
| 2001/0030276 | A1 | * | 10/2001 | Hoshino ................... 250/208.1 |
| 2003/0095800 | A1 | * | 5/2003  | Finizio et al. ............... 396/427 |
| 2005/0211888 | A1 | * | 9/2005  | Sato et al. .................... 250/239 |
| 2006/0098969 | A1 | * | 5/2006  | Asai et al. ..................... 396/89 |
| 2006/0239671 | A1 | * | 10/2006 | Shiraishi et al. ............... 396/89 |

* cited by examiner

*Primary Examiner*—William B. Perkey
*Assistant Examiner*—Minh Q Phan
(74) *Attorney, Agent, or Firm*—Steven M. Reiss

(57) ABSTRACT

An exemplary camera mechanism (8) includes a lens module (10), an image sensor module (20), an electronic module (30), and a transmission module (40). The image sensor module is mounted under the lens module. The electronic module is mounted to at least one of the lens module and the image sensor module. The transmission module has a main body (41), a first electronic connection end (43) and a second electronic connection end (45). The lens module and the image sensor module are mounted on the main body. The first electronic connection end is formed at a top end of the main body. The second electronic connection end is formed at a bottom end of the main body. The first electronic connection end is electrically connected to the electronic module and to the second electronic connection end, and the second electronic connection end is capable of being electrically connected to a mother board (50).

4 Claims, 2 Drawing Sheets

ELECTRONIC CAMERA MECHANISM

BACKGROUND OF THE INVENTION

1. Field of the Invention

The present invention generally relates to camera mechanisms and, more particularly, to an electronic camera mechanism with a transmission module configured (i.e., structured and arranged) for transmitting signals between an electronic module of the camera mechanism and a mother board.

2. Description of Related Art

With the ongoing development of microcircuitry and multimedia technologies, digital cameras are now in widespread use. High-end portable electronic devices, such as mobile phones and personal digital assistants (PDAs), are being developed to be increasingly multi-functional. Many of these portable electronic devices are now equipped with a digital camera mechanism. These electronic devices enable consumers to enjoy capturing digital pictures anytime and anywhere.

In a typical camera mechanism, a lens module is very important to the quality of the pictures captured by the camera module. Generally, a camera mechanism includes a lens module and an image sensor module. Optical image signals are focused by the lens module onto the image sensor module. The image sensor module transforms the optical image signals into electronic image signals. When a distance between the lens module and the image sensor module is adjusted, the definition of the optical image signals received by the image sensor module is also changed. Focusing modules are widely used in such camera mechanisms to facilitate the taking of high quality photos.

As shown in FIG. 2, a typical camera mechanism 91 with a focusing module is electrically connected to a mother board (not shown) by a flexible circuit board 93. The flexible circuit board 93 has an arm 931. One end of the arm 931 is bent to mount into the camera mechanism 91 and thereby electrically connect the focusing module to the mother board. By such a connection, signals may be transmitted between the focusing module and the mother board. However, the flexible circuit board 93 may easily be damaged during manufacturing and/or usage.

Therefore, a new camera mechanism is desired in order to overcome the above-described shortcomings.

SUMMARY

In one embodiment thereof, a camera mechanism includes a lens module, an image sensor module, an electronic module, and a transmission module. The image sensor module is mounted under the lens module. The electronic module is mounted to at least one of the lens module and the image sensor module. The transmission module has a main body, a first electronic connection end, and a second electronic connection end. The lens module and the image sensor module are mounted to the main body. The first electronic connection end is formed at a top end of the main body. The second electronic connection end is formed at a bottom end of the main body. The first electronic connection end is electrically connected to the electronic module and to the second electronic connection end, and the second electronic connection end is capable of being electrically connected to a mother board.

Other advantages and novel features of the embodiments will become more apparent from the following detailed description thereof when taken in conjunction with the accompanying drawings.

BRIEF DESCRIPTION OF THE DRAWINGS

Many aspects of the present camera mechanism can be better understood with reference to the following drawings. The components in the drawings are not necessarily drawn to scale, the emphasis instead being placed upon clearly illustrating the principles of the camera mechanism and its potential applications. Moreover, in the drawings, like reference numerals designate corresponding parts throughout the several views.

DETAILED DESCRIPTION OF THE EMBODIMENTS

Figure 1:
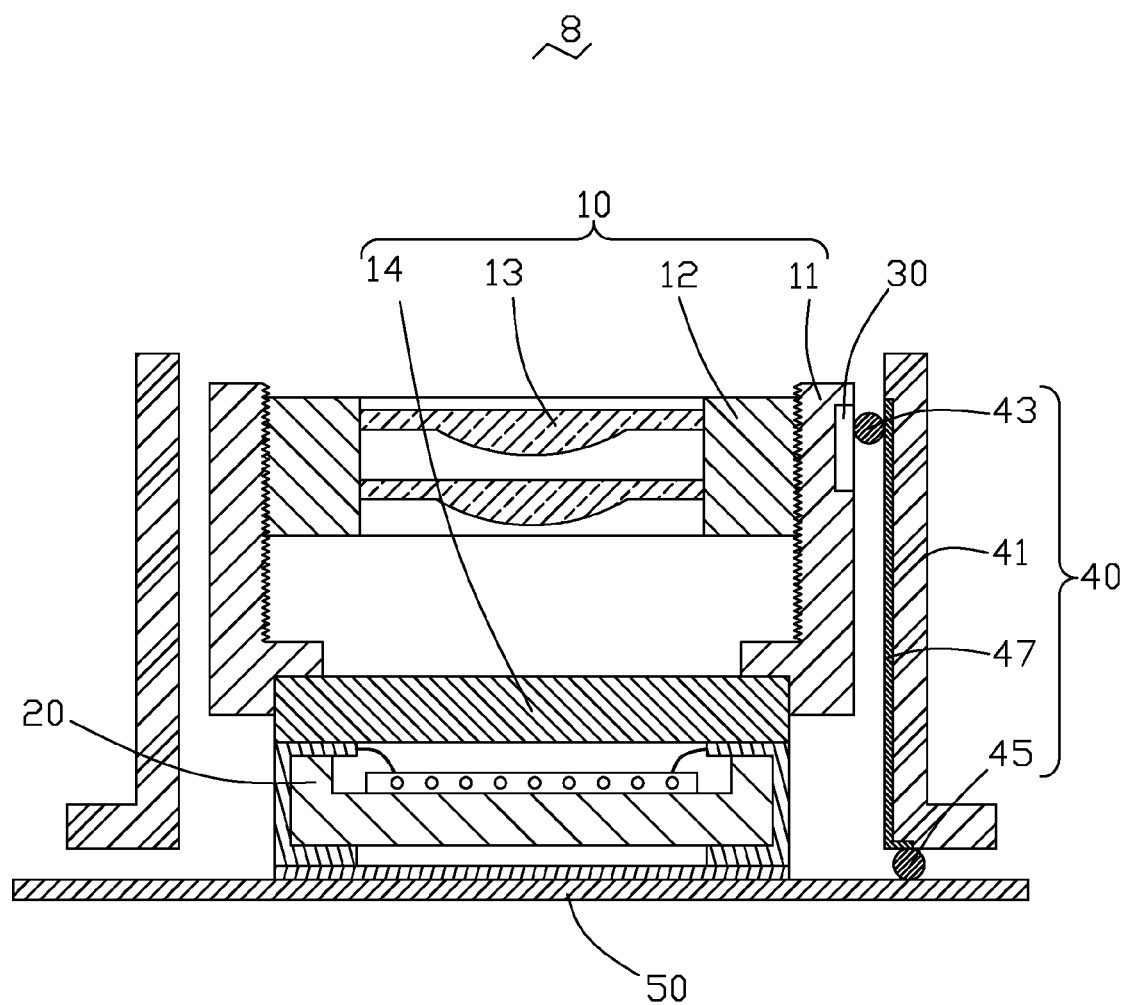
FIG. 1 is a schematic, cut-away view of the present camera mechanism, in accordance with a preferred embodiment.
Figure 2:
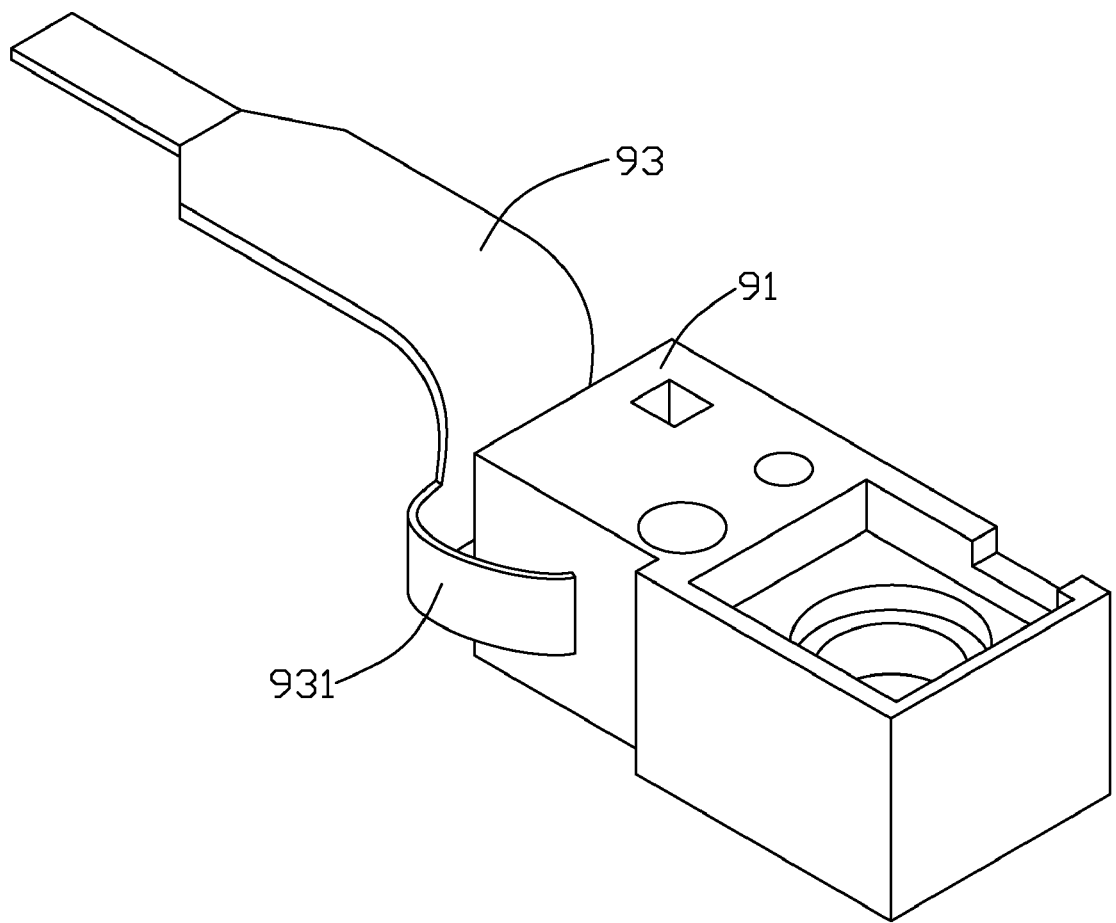
FIG. 2 is a schematic view of a conventional camera mechanism with a flexible circuit board.

Referring now to the drawings in detail, FIG. 1 shows a camera mechanism 8 of a preferred embodiment. The camera mechanism 8 includes a lens module 10, an image sensor module 20, a focusing module 30, a transmission module 40, and a mother board 50. The lens module 10, the image sensor module 20, and the focusing module 30 are received in the transmission module 40. The transmission module 40 is formed on the mother board 50.

The lens module 10 is configured to concentrate optical signals traveling incident to the lens module 10 onto the image sensor module 20 to facilitate image capture. The lens module 10 includes a seat 11, a lens barrel 12, a plurality of lenses 13, and a transparent board 14. The seat 111 and the lens barrel 12 are both hollow cylinders and are cooperatively shaped such that the lens barrel is operatively received within the seat 11. The lens barrel 12, in turn, has the lenses 13 mounted therein. The lens barrel 12 is, in particular, threadingly and, thus, adjustably fixed within the seat 11 and is thus configured for permitting/facilitating a change in a position of the lenses 13 relative to the image sensor module 20. The seat 11 is mounted on the transparent board 14. The transparent board 14 is made of a transparent material, such as glass, thereby allowing optical signals to travel therethrough.

The image sensor module 20 is located under the transparent board 14 and transforms the optical signals into electronic signals. In order to achieve high quality pictures, an image sensor of the image sensor module 20 is advantageously located at a focusing plane of the lens module 10. The focusing module 30 is mounted to the lens module 10 and, advantageously, is configured for adjusting a distance between the lenses 13 of the lens module 10 and the image sensor of the image sensor module 20, so that the image sensor is thereby appropriately located in the focusing plane of the lenses 13.

The transmission module 40 includes a main body 41, a first electronic connection end 43, a second electronic connection end 45, and a wire 47. In the illustrated embodiment, the main body 41 takes the form of sleeve barrel 41. The sleeve barrel 41 is substantially cylindrical in shape. The lens module 10, the image sensor module 20, and the focusing module 30 are operatively received in the sleeve barrel 41. The first electronic connection end 43 is formed at an inner surface of a top end of the sleeve barrel 41 and is electrically connected to the focusing module 30. The second electronic connection end 45 is formed at a surface of a bottom end of the sleeve barrel 41, adjacent the mother board 50. The wire 47 can, advantageously, be mounted on the inner surface of the sleeve barrel 41 and electrically connects the first electronic connection end 43 and the second electronic connection end 45.

The sleeve barrel 41 of the transmission module 40 is mounted on the mother board 50 with the image sensor module 20 located on the mother board 50. The image sensor module 20 is electrically connected to the mother board 50 so that the mother board 50 can process electronic signals transmitted from the image sensor module 20. The second electronic connection end 45 is electrically connected to the mother board 50, thus allowing signals to be transmitted (via the first electronic connection end 43, the wire 47, and the second electronic connection end 45) between the focusing module 30 and the mother board 50.

It should be understood that the transmission module 40 can steadily and conveniently transmit signals between the focusing module 30 and the mother board 50. The sleeve barrel 41 of the transmission module 40 is closely mounted around the lens module 10 and the image sensor module 20, thereby facilitating a strong electrical connection between the focusing module 30 and the first electronic connection end 43. The second electronic connection end 45 can be exposed to ambient (e.g., the air), as shown, and is easily mounted on the mother board 50 so that the transmission module 40 is not likely to be damaged during manufacturing and/or camera usage. Alternatively, the second electronic connection end 45 is insulated from the ambient, to reduce the potential for shock and/or shorting.

It should be understood that the focusing module 30 is advantageously mounted to the image sensor module 20 in a manner to facilitate an adjustment of the distance between the lens module 10 and the image sensor module 20 (i.e., adjustment of the focus distance). The focusing module 30 may further incorporate other electronic modules, such as a flash lamp for producing a high-intensity light of very short duration for use in photography. In other alternative embodiments, the first electronic connection end 43 can be connected to other electronic devices. The other electronic devices can be connected to the image sensor module 20, instead of the lens module 10. The main body 41 of the transmission module 40 may be of other forms, such as cube-shaped.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A camera mechanism, comprising:
   a lens module;
   an image sensor module mounted under the lens module;
   an electronic module mounted to at least one of the lens module and the image sensor module; and
   a transmission module having a main body, a first electronic connection end, a second electronic connection end, and a wire, the main body being a sleeve barrel, the lens module and the image sensor module being mounted within the main body, the first electronic connection end being formed at an inner surface of a top end of the main body, the second electronic connection end being formed at a bottom surface of the main body, the first electronic connection end being electrically connected to the electronic module, the second electronic connection end being capable of being electrically connected to a mother board, the wire being mounted on the inner surface of the sleeve barrel and electrically connecting the first electronic connection end and the second electronic connection end.

2. The camera mechanism as claimed in claim 1, wherein the sleeve barrel is a hollow cylinder.

3. The camera mechanism as claimed in claim 1, wherein the electronic module is a focusing module configured for adjusting a distance between the lens module and the image sensor module.

4. The camera mechanism as claimed in claim 1, wherein the second electronic connection end is electrically connected directly to the mother board, thus allowing signals to be transmitted between the electronic module and the mother board.

* * * * *